(12) United States Patent
Rabbani Rankouhi et al.

(10) Patent No.: US 12,505,499 B2
(45) Date of Patent: Dec. 23, 2025

(54) HINT FOR SCHEDULING GRAPHICS RAY TRACING WORK

(71) Applicant: Apple Inc., Cupertino, CA (US)

(72) Inventors: Ali Rabbani Rankouhi, Bushey (GB);
Roman Tereshin, San Jose, CA (US);
Luca O. Iuliano, Milton Keynes (GB);
Sheenam Jayaswal, Austin, TX (US);
Rohit Kumar Singh, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/524,729

(22) Filed: Nov. 30, 2023

(65) Prior Publication Data
US 2025/0095098 A1 Mar. 20, 2025

Related U.S. Application Data

(60) Provisional application No. 63/583,947, filed on Sep. 20, 2023.

(51) Int. Cl.
*G06T 15/06* (2011.01)
*G06F 9/48* (2006.01)
*G06F 9/50* (2006.01)
*G06T 1/20* (2006.01)
*G06T 15/00* (2011.01)

(52) U.S. Cl.
CPC ............... *G06T 1/20* (2013.01); *G06F 9/4881* (2013.01); *G06F 9/5027* (2013.01); *G06T 15/005* (2013.01)

(58) Field of Classification Search
CPC ........................................................ G06T 1/20

USPC .......................................................... 345/501
See application file for complete search history.

(56) References Cited

U.S. PATENT DOCUMENTS

| | | |
|---|---|---|
| 2011/0032257 A1* | 2/2011 | Peterson ............... G06T 1/60 345/420 |
| 2016/0284118 A1 | 9/2016 | Howson et al. |
| 2016/0335791 A1 | 11/2016 | Peterson et al. |
| 2018/0293102 A1* | 10/2018 | Ray ...................... G06F 9/4881 |
| 2022/0036630 A1 | 2/2022 | Rabbani Rankouhi et al. |
| 2022/0036637 A1 | 2/2022 | Rabbani Rankouhi et al. |

(Continued)

FOREIGN PATENT DOCUMENTS

WO 2008-091958 A2 7/2008

OTHER PUBLICATIONS

International Search Report and Written Opinion in PCT Appl. No. PCT/US2024/042928 mailed Dec. 2, 2024, 8 pages.

*Primary Examiner* — Samantha (Yuehan) Wang
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to graphics processor that support ray tracing. In particular, shader circuitry may be configured to adjust a scheduling priority of a single-instruction multiple-data (SIMD) group of a shader program based on a hint that the SIMD group has an upcoming ray intersect command for ray intersect accelerator circuitry and based on a resource usage indication from the ray intersect accelerator circuitry. This may advantageously reduce cache thrashing, e.g., when shaders may allocate memory for ray intersect commands and fill a shared cache faster than the ray intersect accelerator circuitry can process the rays.

21 Claims, 10 Drawing Sheets

(56) References Cited

U.S. PATENT DOCUMENTS

| | | |
|---|---|---|
| 2022/0068009 A1 | 3/2022 | Wald et al. |
| 2023/0016927 A1* | 1/2023 | Goudie ................ G06T 15/005 |
| 2023/0095535 A1* | 3/2023 | Maiyuran ................ G06T 1/60 |
| | | 345/501 |
| 2023/0109990 A1* | 4/2023 | Pappu ....................... G06T 1/20 |
| | | 345/501 |

* cited by examiner

HINT FOR SCHEDULING GRAPHICS RAY TRACING WORK

The present application claims priority to U.S. Provisional App. No. 63/583,947, entitled "Hint for Scheduling Graphics Ray Tracing Work," filed Sep. 20, 2023, the disclosure of which is incorporated by reference herein in its entirety.

BACKGROUND

Technical Field

This disclosure relates generally to computer graphics processors and more particularly to ray tracing.

Description of Related Art

In computer graphics, ray tracing is a rendering technique for generating an image by tracing the path of light and simulating the effects of its encounters with virtual objects. Ray tracing may allow resolution of visibility in three dimensions between any two points in the scene, which is also the source of most of its computational expense. A typical ray tracer samples paths of light through the scene in the reverse direction of light propagation, starting from the camera and propagating into the scene, rather than from the light sources (this is sometimes referred to as "backward ray tracing"). Starting from the camera has the benefit of only tracing rays which are visible to the camera. This system can model a rasterizer, in which rays simply stop at the first surface and invoke a shader (analogous to a fragment shader) to compute a color. More commonly secondary effects—in which the exchange of illumination between scene elements, such as diffuse inter-reflection and transmission—are also modelled. Shaders that evaluate surface reflective properties may invoke further intersection queries (e.g., generate new rays) to capture incoming illumination from other surfaces. This recursive process has many formulations, but is commonly referred to as path tracing.

Different GPUs may utilize varying degrees of hardware acceleration for ray tracing tasks. For example, ray intersect acceleration circuitry may be configured to traverse an acceleration data structure by testing for intersection with hierarchically arranged bounding volumes (e.g., boxes) to determine a subset of primitives (e.g., triangles) in a graphics scene to be intersection tested. The ray/triangle intersection tests may also be hardware accelerated. A shader program that invokes the hardware accelerator circuitry may allocate memory space for ray data prior to the invocation and ray data may be stored in a cache that is accessible to the accelerator circuitry.

DETAILED DESCRIPTION

A graphics processor may include shader cores configured to execute graphics programs. The processor may accelerate certain graphics tasks, such as ray tracing tasks, using specialized circuitry. For example, a ray intersect accelerator (RIA) may be configured to traverse an accelerator data structure (ADS) for rays in a graphics scene and may include box test circuitry configured to test whether rays intersect with bounding boxes represented by the ADS.

In this scenario, a shader may include instructions that allocate memory space for a ray prior to invoking the ray intersect accelerator (e.g., with a store_ray_data instruction followed by an intersect_ray command). The ray data may be stored in a cache that may be shared with other types of data (e.g., the ray data may be stored in a shader core memory space but the cache may also store data from other memory spaces, e.g., thread private spaces, threadgroup spaces, device space, etc.). In some implementations, this introduces the possibility that space for a substantially larger number of rays could be allocated than the ray intersect accelerator can handle over a particular time interval. This could cause ray data to be cached but then evicted to make room for other data before it is consumed by the ray accelerator circuitry. Generally, caching data substantially before it will be used may cause cache inefficiencies such as thrashing.

Therefore, in disclosed embodiments, shader programs include a hint before allocating memory space for ray data and GPU scheduler circuitry is configured to schedule threads based on the hint. Generally, the hint may prevent threads from polluting a cache when the ray intersect accelerator is not ready to accept more rays. The hint may be compiler-generated, for example. The hint may be referred to as "intersect_ray_soon" and may indicate that a thread (or group of threads such as a single-instruction multiple-data (SIMD) group) will have subsequent intersect_ray commands. Arbitration circuitry may adjust the priority of the thread appropriately based on the hint and based on current resource usage of the ray intersect accelerator (e.g., reducing priority to block the thread when the ray intersect accelerator is busy or increasing the priority of the thread when the ray intersect accelerator is idle).

Further, control circuitry may deactivate threads that have already been scheduled, in response to detecting the intersect_ray_soon hint (e.g., in multi-stage scheduler embodiments discussed in detail below). The control circuitry may also track resource usage of the accelerator circuitry using a credit system, for example.

In various embodiments, disclosed techniques may advantageously tailor the amount of ray data allocated to the number of rays that the ray intersect circuitry can handle, which may improve efficiency of a shared cache.

Graphics Processing Overview

Figure 1A:
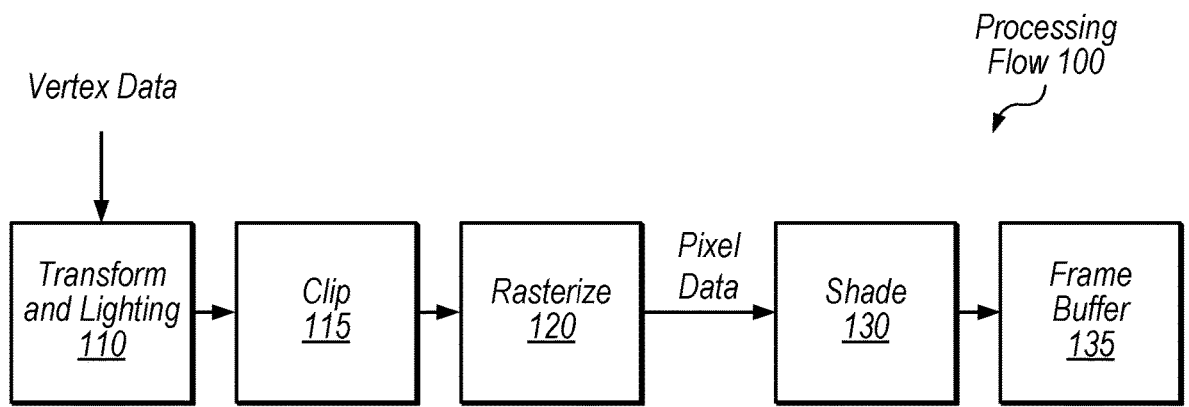
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
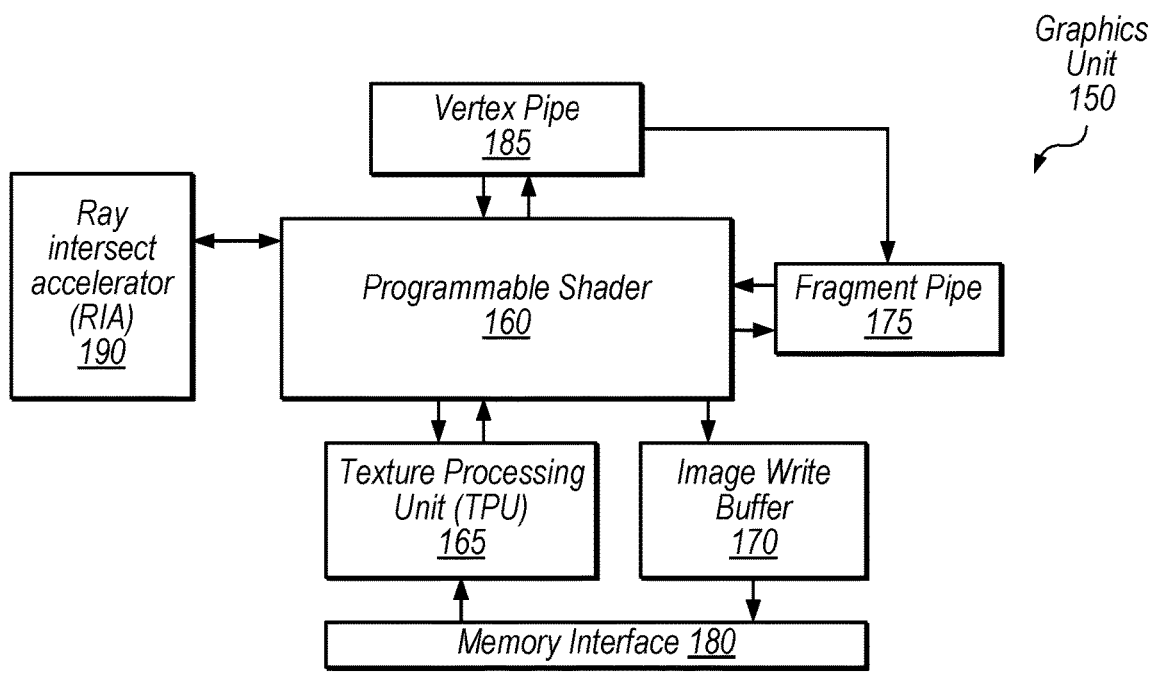
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Arbitration Based on Ray Insect Hint

Figure 2:
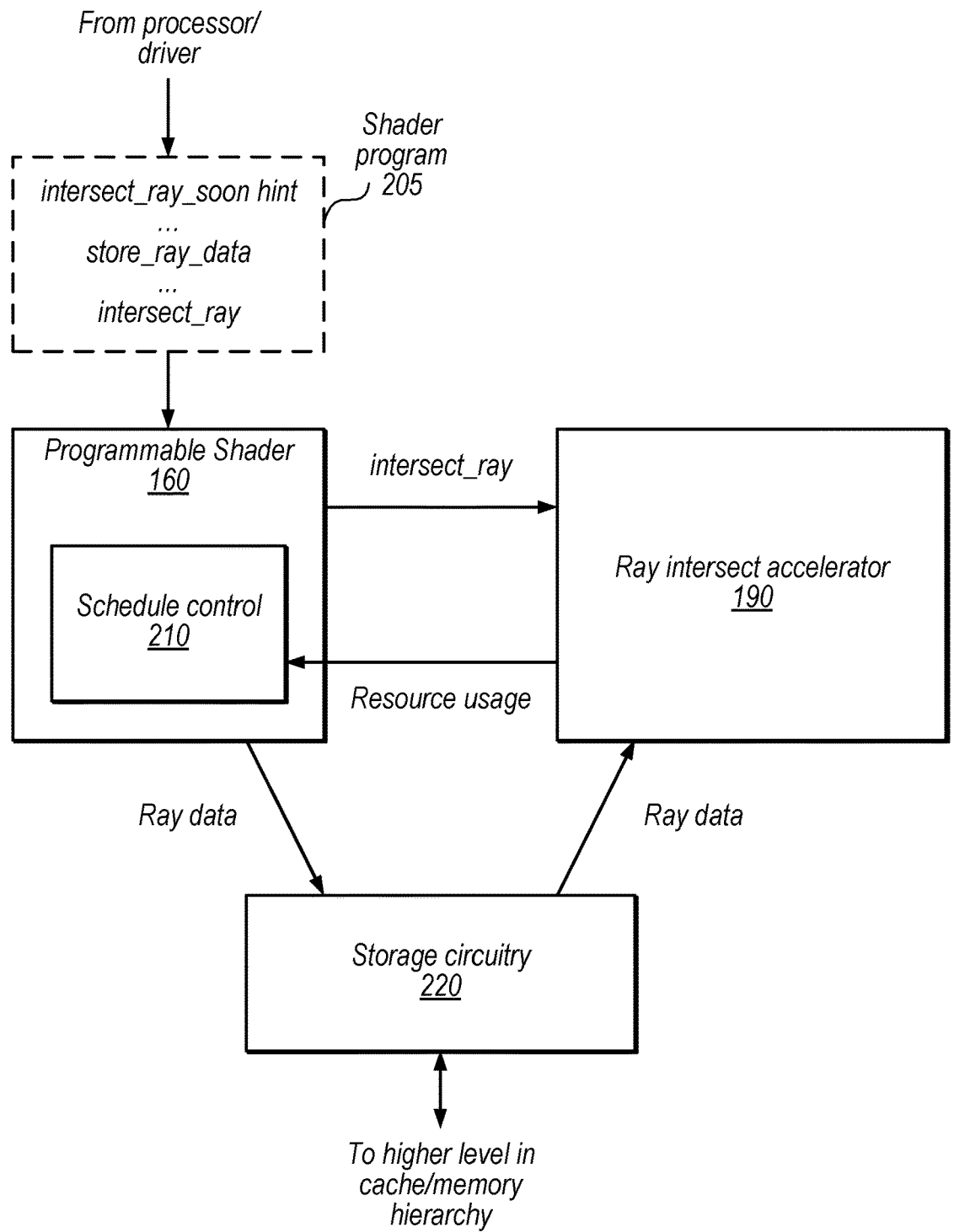
FIG. 2 is a block diagram illustrating example graphics processor circuitry configured to schedule work based on a ray tracing hint and resource usage indicated by a ray intersect accelerator, according to some embodiments.

FIG. 2 is a block diagram illustrating example graphics processor circuitry configured to schedule work based on a ray tracing hint and resource usage indicated by a ray intersect accelerator, according to some embodiments.

In the illustrated embodiment, programmable shader 160 executes a shader program 205, e.g., received from a driver executed by a central processing unit. As shown, the shader program includes an intersect_ray_soon hint, a store_ray_data instruction, and an intersect_ray command for the ray intersect accelerator 190 that operates on the ray data. Note that example background information for various techniques discussed herein may be found in U.S. patent application Ser. No. 17/103,433, titled "Ray Intersect Circuitry with Parallel Ray Testing," and filed Nov. 24, 2020, which is incorporated by reference herein in its entirety. For example, the '433 application provides example ray intersect accelerator configurations, allocations for rays in a shader core memory space, traversal techniques for an ADS, etc.

Programmable shader 160, in the illustrated embodiment, includes schedule control circuitry 210. In some embodiments, schedule control 210 is configured to adjust priority of threads of shader program 205 based on whether they include a hint and based on resource usage information for ray intersect accelerator 190. The resource usage may be a feedback mechanism based on command FIFO occupancy in the ray intersect accelerator 190, for example. This may be tracked using a credit mechanism, as discussed below with reference to FIG. 5.

Storage circuitry 220, in the illustrated embodiment, is configured to store ray data (e.g., corresponding to the store_ray_data command) and provide ray data to ray intersect accelerator 190 (e.g., for use in performing bounding box intersection tests, primitive filter tests, primitive intersection tests, or some combination thereof). In some embodiments, storage circuitry 220 is a cache accessible to both programmable shader 160 and ray intersect accelerator 190. For example, storage circuitry may include content-addressable memory circuitry configured to check tags for cache hits/misses and random-access memory (RAM) circuitry configured to store data for corresponding entries. As shown, storage circuitry 220 may communicate with a higher level in a cache memory hierarchy (e.g., if circuitry 220 is an L1 cache, it may communicate with an L2 cache, if circuitry 220 is an L2 cache it may communicate with a memory cache or a memory, etc.). Further, there may be one or more other cache levels lower than storage circuitry 220 (e.g., included in programmable shader 160 or ray intersect accelerator 190).

As discussed above, storage circuitry 220 may cache various types of data, so it may be desirable to keep the footprint of ray data in storage circuitry 220 within a size that ray intersect accelerator 190 can process in the near future. Therefore, schedule control 210 may decrease priority of threads with the intersect_ray_soon hint, reducing or preventing their ability to allocate ray data, when ray intersect accelerator 190 is busy. Detailed example scheduling techniques are discussed below with reference to FIG. 3.

Example Hint-Based Arbitration with Two-Stage Scheduler

Figure 3:
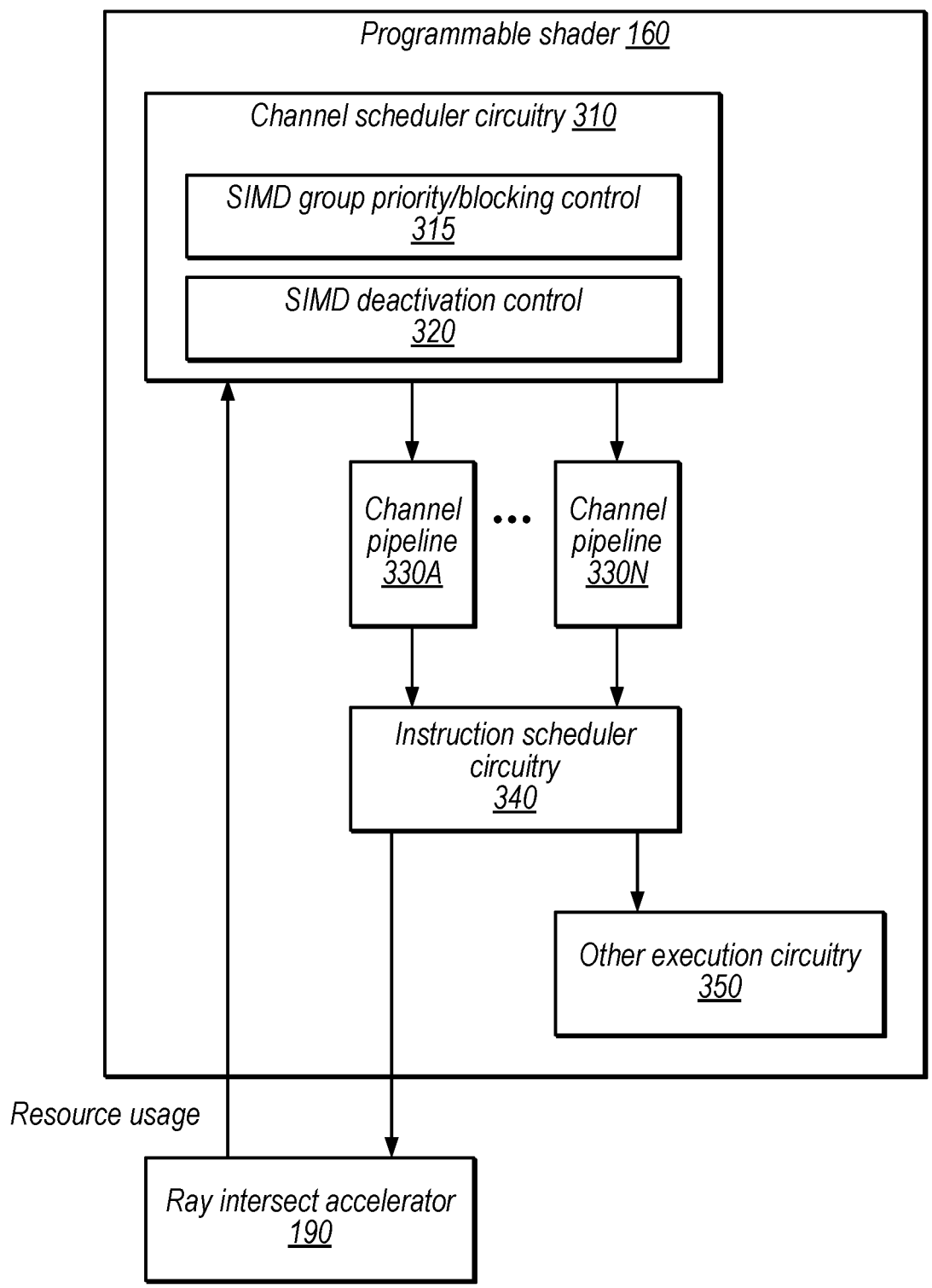
FIG. 3 is a block diagram illustrating example multi-stage scheduling in a GPU that uses hint-based allocation for one or more stages, according to some embodiments.

FIG. 3 is a block diagram illustrating example multi-stage scheduling in a GPU that uses hint-based allocation for one or more stages, according to some embodiments. In the illustrated example, programmable shader 160 includes channel scheduler circuitry 310 configured to assign SIMD groups to channel pipelines 330A-330N and instruction scheduler circuitry 240 configured to assign instructions from SIMD groups that are active in channel pipelines 330 to execution circuitry (e.g., other execution circuitry 350 or ray intersect accelerator 190).

Note that disclosed techniques may be used to adjust scheduling in single-stage scheduling architectures. Multi-stage examples are discussed herein for purposes of explanation and to provide background for certain improvements in this particular context, but are not intended to limit the scope of the present disclosure. U.S. patent application Ser. No. 18/054,376 titled "Multi-stage Thread Scheduling" is incorporated by reference herein in its entirety. The '376 application discusses various techniques for multi-stage scheduling of threads/SIMD groups that may be utilized in various embodiments discussed herein.

Channel scheduler circuitry 310, in the illustrated embodiment, is configured to arbitrate among SIMD groups that are ready to be assigned to a channel pipeline. Circuitry 310 may also be referred to as a first-stage scheduler or SIMD group scheduler. Note that other embodiments may not implement SIMD techniques and a single thread may be assigned to a given channel. In other embodiments, any appropriate set of one or more threads may be assigned to a given channel. Circuitry 310 may implement an age-based scheduler in which older threads are generally prioritized for assignment to channels. As discussed in detail below, however, this age-based scheme (or any other appropriate default scheme) may be modified in certain scenarios.

SIMD group priority/block control circuitry 315, in the illustrated embodiment, is configured to control SIMD group priority and may block SIMD groups in certain scenarios (e.g., when the SIMD groups have lower priority, are younger, are marked for blocking for some other reason such as targeting ray intersect accelerator 190 when it is busy, etc.).

SIMD deactivation control 320, in some embodiments, is configured to deactivate a SIMD group from a channel pipeline 330 in certain situations. For example, in some implementations, SIMD groups may be scheduled to a channel pipeline 330 before the intersect_ray_soon hint is encountered. As another example, the feedback mechanism for ray intersect accelerator resource usage may have a delay such that a SIMD group that has encountered an intersect_ray_soon hint was scheduled to a channel pipeline before it is known that ray intersect accelerator 190 reached a threshold usage that would not have permitted the SIMD group to be activated. Both hardware and software-assisted techniques for deactivating such SIMD groups are discussed in detail below with reference to FIG. 5. Note that deactivated SIMD groups may become eligible for subsequent re-activation to a channel pipeline 330 by channel scheduler circuitry 310, immediately or based on a subsequent event (although the priority of a SIMD group may be adjusted, typically lower, in conjunction with deactivation).

Channel pipelines 330, in some embodiments, include various stages such as a decode stage, a hazard stall stage, etc. The decode stage may identify the nature of an instruction, which may specify which type of execution pipeline should handle the instruction (e.g., ray intersect accelerator 190 or a pipeline of other execution circuitry 350 such as an integer pipeline, floating-point pipeline, etc.). Because at least part of instruction decode may occur within a channel pipeline 330, specific instructions included in a thread may not be considered when assigning threads to channels (other than based on compiler hints). A hazard stall stage may stall an instruction until any hazards are resolved. Thus, instructions may not be eligible for arbitration at the instruction scheduler circuitry 340 until any hazards are resolved.

Instruction scheduler circuitry 340, in the illustrated embodiment, is configured to arbitrate among ready instructions from channel pipelines 330 for assignment to execution circuitry. Instruction scheduler circuitry 340 may select multiple instructions for assignment to different execution pipelines in a given cycle.

Other execution circuitry 350 may include pipelines configured to perform the operation specified by a given instruction and may include various different units, e.g., integer units, sample units, floating-point units, load/store units, etc. Some execution pipelines may be different instantiations of the same type of unit, e.g., multiple integer units. In other embodiments, execution pipelines include at most one of a given type of unit. Generally, at certain times, there may be a greater number of instructions in channel pipelines 330 that target a certain type of execution resource than the number of available execution pipelines of that type. Instruction scheduler circuitry 340 may arbitrate among the channel pipelines 330 in this scenario.

As shown, ray intersect accelerator 190 is configured to report its resource usage to channel scheduler circuitry 310, in the illustrated embodiment. In other embodiments, ray intersect accelerator 190 may report its resource usage to one or more of various appropriate stages of a multi-stage scheduler for consideration in conjunction with hint information.

Therefore, channel scheduler circuitry 310, in some embodiments, is configured to adjust the priority of a SIMD group based on the resource usage and based on whether the SIMD group has encountered an intersect_ray_soon hint (or whether a threadgroup that includes the SIMD group has encountered an intersect_ray_soon hint). Thus, the hint and the ray intersect accelerator 190 resource usage may affect which SIMD groups are selected for activation to channel pipelines 330.

Figure 4:
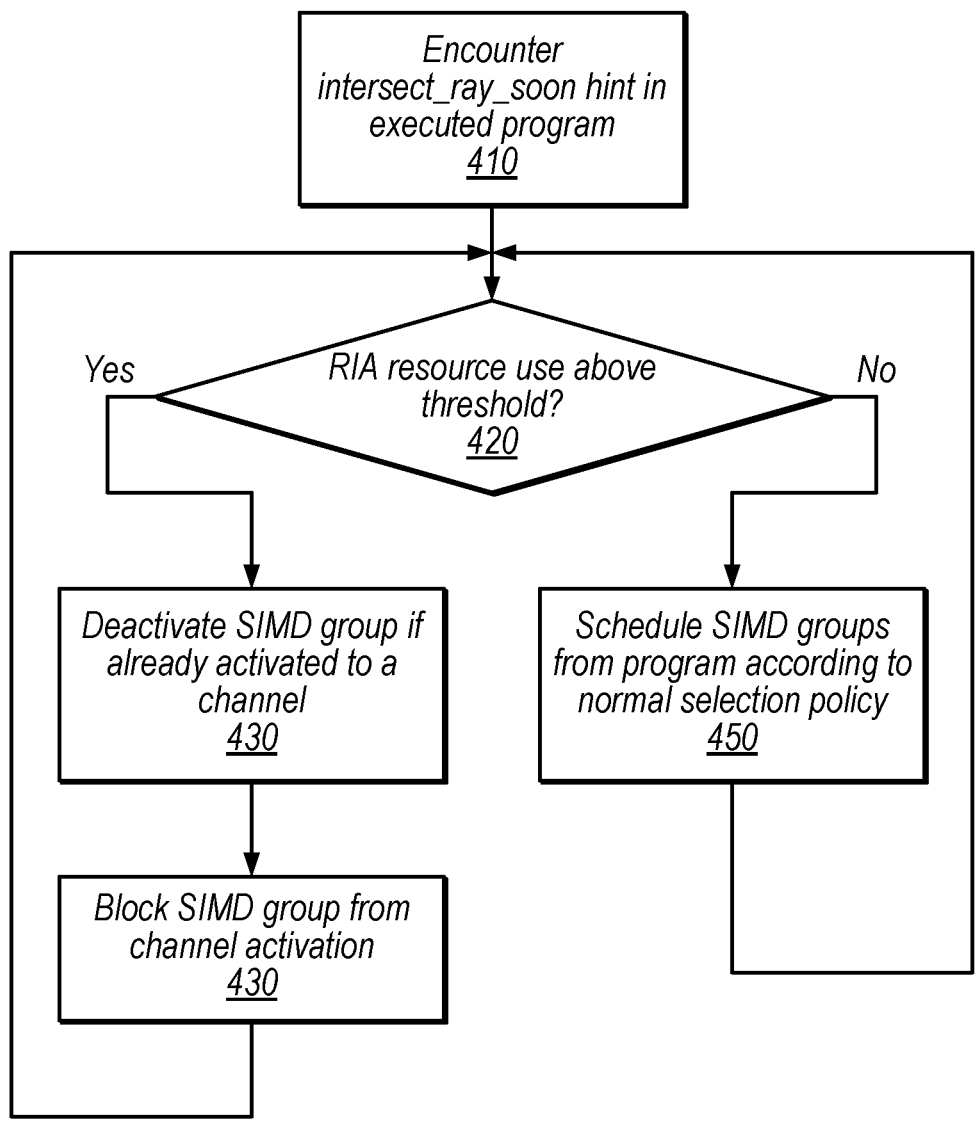
FIG. 4 is a flow diagram illustrating an example technique for scheduling graphics work based on a ray tracing hint, according to some embodiments.

FIG. 4 is a flow diagram illustrating an example technique for scheduling graphics work based on a ray tracing hint, according to some embodiments. At 410, in the illustrated embodiment, shader circuitry encounters an intersect_ray_soon hint in an executed program. In response to detecting the hint, at 420 the shader circuitry determines whether ray intersect accelerator resource usage is above a threshold. If not, flow proceeds to 450 and the shader circuitry schedules SIMD groups from the program according to a normal selection policy. If the resource use was above the threshold at 420, flow proceeds to 430 and the shader circuitry deactivates the SIMD group if it was already activated to a channel. At 440, the shader circuitry blocks the SIMD group from channel activation. This may include setting a block indication (e.g., a single bit), reducing priority of the SIMD group, etc. In other embodiments, the shader circuitry may lower the priority of a SIMD group at 430 but may not completely block it from being activated to a channel. The blocked SIMD groups may remain blocked until RIA resource use drops below the threshold.

Note that in some embodiments, control circuitry may track intersect_ray_soon hints on a per-threadgroup basis. In these embodiments, the control circuitry may detect that a given SIMD group includes a hint, based on other SIMD groups in a threadgroup, prior to actually encountering the hint in that SIMD group.

Example Resource Usage Tracking

Figure 5:
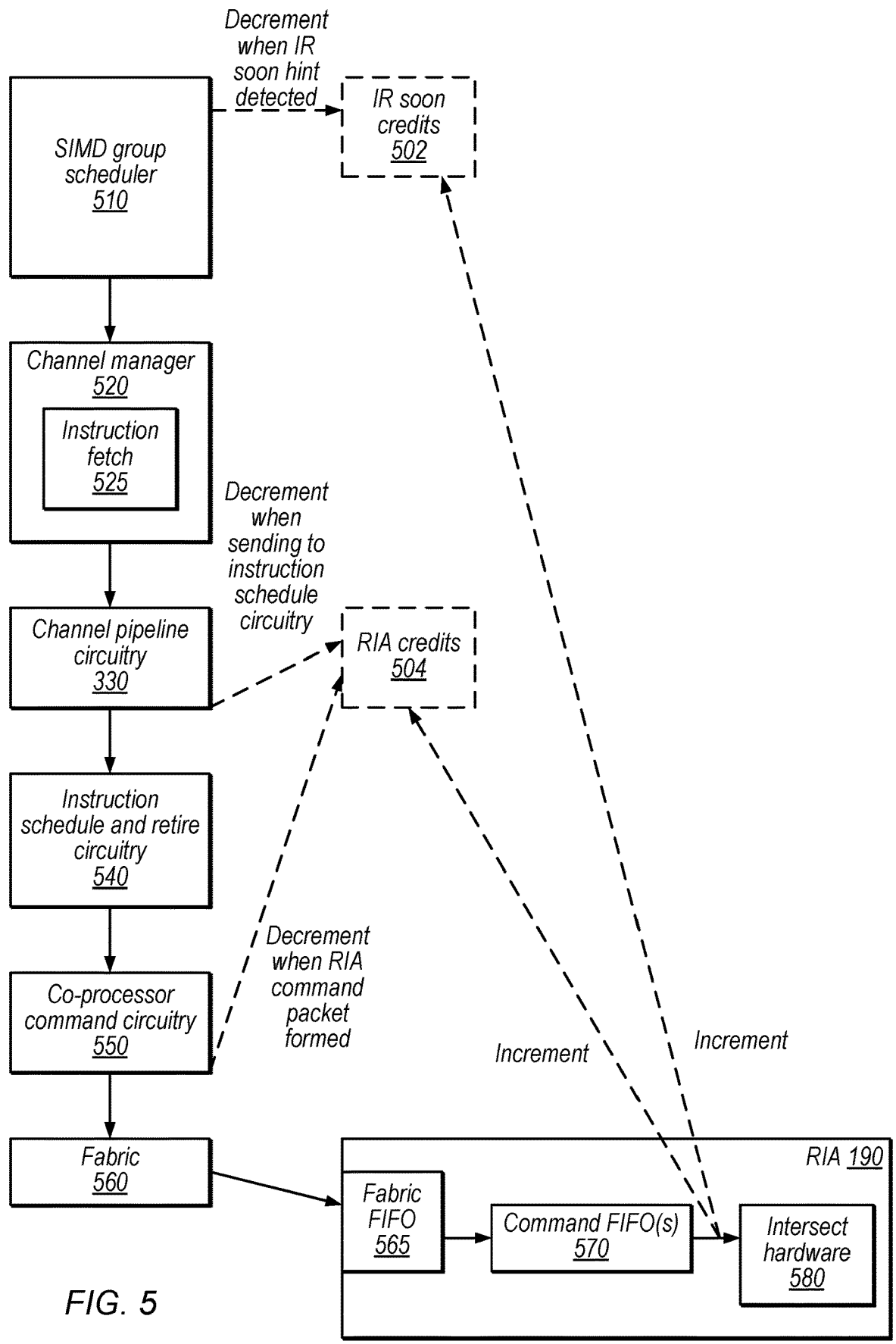
FIG. 5 is a block diagram illustrating example credit control circuitry configured to track resource using of ray intersect accelerator circuitry, according to some embodiments.

FIG. 5 is a block diagram illustrating example credit control circuitry configured to track resource using of ray intersect accelerator circuitry, according to some embodiments. In the illustrated example, programmable shader 160 includes SIMD group scheduler 510, channel manager 520, channel pipeline circuitry 330, instruction schedule and retire circuitry 540, and co-processor command circuitry 550. Graphics unit 150 also includes fabric 560, in this example (which may be a co-processor network configured to convey information from programmable shader 160 to ray intersect accelerator 190). In the illustrated example, the system utilizes RIA credits and IR_soon credits to track and control resource usage.

SIMD group scheduler 510, in some embodiments, is configured to manage SIMD-group-scoped state information and identify highest-priority SIMD groups that are ready to execute, according to an arbitration scheme. The arbitration scheme may be primarily age-based but may also consider other factors. SIMD group scheduler may correspond to channel scheduler circuitry 310.

Channel manager circuitry 520, in some embodiments, is configured to fetch instructions (e.g., using instruction fetch circuitry 525) and dispatch them from channel pipeline circuitry 330 to instruction schedule and retire circuitry 540 when their hazards have been resolved. Circuitry 520 may manage channel activation and deactivation, manage the program counter for a given SIMD group, manage architectural state (e.g., accessing special registers, which may implement SIMD-group-scoped architectural special registers such as the program counter), fetch instructions, and dispatch instructions. Channel manager 520 may read special registers when activating a SIMD group into a channel and write special registers when deactivating a SIMD group from a channel. Channel pipeline circuitry 330 may implement multiple channel pipelines, as discussed in detail above.

Instruction schedule and retire circuitry 540, in some embodiments, is configured to manage execution resources inside a datapath block and schedule individual instruction execution. This may include fine decode of incoming instructions, sequencing microoperations, data dependency and hazard detection, managing a read operand cache and write buffer circuitry, priority-based instruction scheduling, generating read and write requests to a low-level data cache, generating pipeline control signals, and enforcing SIMD group deactivations. Circuitry 540 may also be referred to as a resource manager. Note that portions of circuitry 540 may be included in channel pipeline circuitry 330.

Co-processor command circuitry 550, in some embodiments, is configured to coalesce commands to ray intersect accelerator 190, when possible, and form packets with one or more commands for transmission over fabric 560.

Ray intersect accelerator 190, in the illustrated embodiment, includes fabric FIFO 565 configured to receive commands from fabric 560 and provide commands to one or more command FIFO(s) 570, which are configured to queue commands for delivery to intersect hardware (e.g., hardware configured to perform one or more of: traverse an ADS, perform bounding box intersection tests, determine a set of primitives for testing, and perform primitive intersection tests.

Generally, in some embodiments, only SIMD groups that successfully obtain an IR_soon credit are allowed to write to shader core space and proceed to an intersect_ray command. Other SIMD groups (particularly those that have reached their critical section for RIA) may wait until an IR_soon credit becomes available. Note that the "critical section" of a SIMD group refers to the region of the shader beginning with the write to shader core space and ending with an intersect_ray command.

In the illustrated embodiment, credit control circuitry decrements IR_soon credits 502 when an intersect_ray_soon hint is detected in a SIMD group, if an IR_soon credit is available. If no credits are available, the SIMD group may be blocked as discussed above. IR_soon credits are decremented when an intersect_ray command is issued from a FIFO 570 to intersect hardware 580 of ray intersect accelerator 190. Thus, the illustrated example represents an example embodiment of control that is roughly based on the occupancy of command FIFO(s) 570.

The RIA credits 504, in some embodiments, provide credit functionality for RIA command packets that may be unrolled. For example, for an N-thread SIMD group, different threads typically have the same bounding volume hierarchy address for the ADS for an intersect_ray command, but potentially could have different BVH addresses. In that case, the command may be unrolled into multiple RIA credit 504 decrements by co-processor command circuitry 550 (in addition to the single typical decrement by channel pipeline circuitry 330) and the unrolled commands may cause multiple increments on issuance from command FIFO(s) 570. This detailed RIA credit implementation may be independent from the IR_soon credits, however, and may be omitted in some embodiments.

In some embodiments, the system may track other types of resource usage as inputs to priority adjustments (or more generally to scheduling decisions), in combination with or in place of buffer status. Other resources whose usage may be tracked include, without limitation: the number of rays currently being processed by ray intersection accelerator 190 and an amount of memory space being used (e.g., use of a shader core space that store ray data and is accessible to both the shader core and ray accelerator hardware).

The following discussion provides more details regarding channel deactivation in the context of the detailed example embodiment of FIG. 5. SIMD group scheduler 510 may not know about SIMD groups already running in change manager 520 before an intersect_ray_soon hint is encountered. In some embodiments, one or both of the following techniques are implemented to deactivate such SIMD groups.

In some embodiments, channel pipeline circuitry 330, instruction schedule and recite circuitry 540, or both may assist in deactivation. For example, a channel that sees the first occurrence of the intersect_ray_soon hint may trigger a deactivation to SIMD group scheduler 510 with a reason that indicates the hint. The SIMD group scheduler 510 may then park the SIMD group in a "wait_IR_soon" state, at least until IR_soon credits are available. SIMD groups that have already obtained an IR_soon credit are not blocked (and may be allowed to reactivate if deactivated). In this manner, the critical sections of a given SIMD group may be guarded by the IR_soon credits.

In some embodiments, software assists in the deactivation. For example, the compiler may insert a yield instruction just before the critical section, which may trigger a compulsory deactivation from channel pipeline circuitry 330 into SIMD group scheduler 510. SIMD group scheduler 510 may then handle the IR_soon credit grab or blocking as discussed above.

In various embodiments, disclosed techniques may advantageously ensure that SIMD groups that allocate space in a cache for ray tracing operations are not allowed to allocate until ray intersect accelerator 190 actually has resources available for those SIMD groups.

Example Methods

Figure 6:
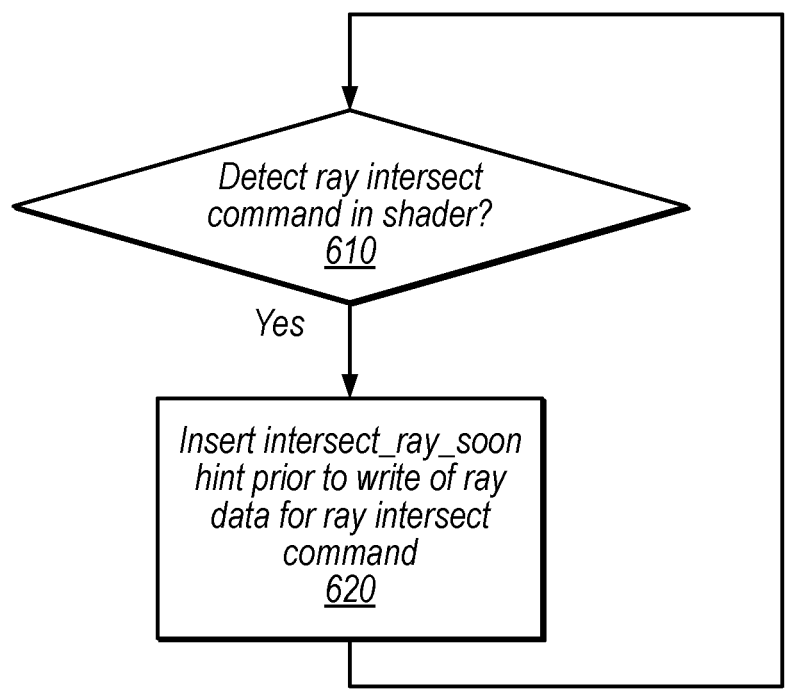
FIG. 6 is a flow diagram illustrating an example method for inserting a ray intersect hint in a shader program, according to some embodiments.

FIG. 6 is a flow diagram illustrating an example method for inserting a ray intersect hint in a shader program, according to some embodiments. At 610, in the illustrated embodiment, a compiler determines whether a shader includes a ray intersect command. If so, the compiler inserts an intersect_ray_soon hint prior to a write of ray data for the intersect command (e.g., prior to a memory allocation in shader core space). The hint may be an independent instruction or may be included in a field of another instruction.

Figure 7:
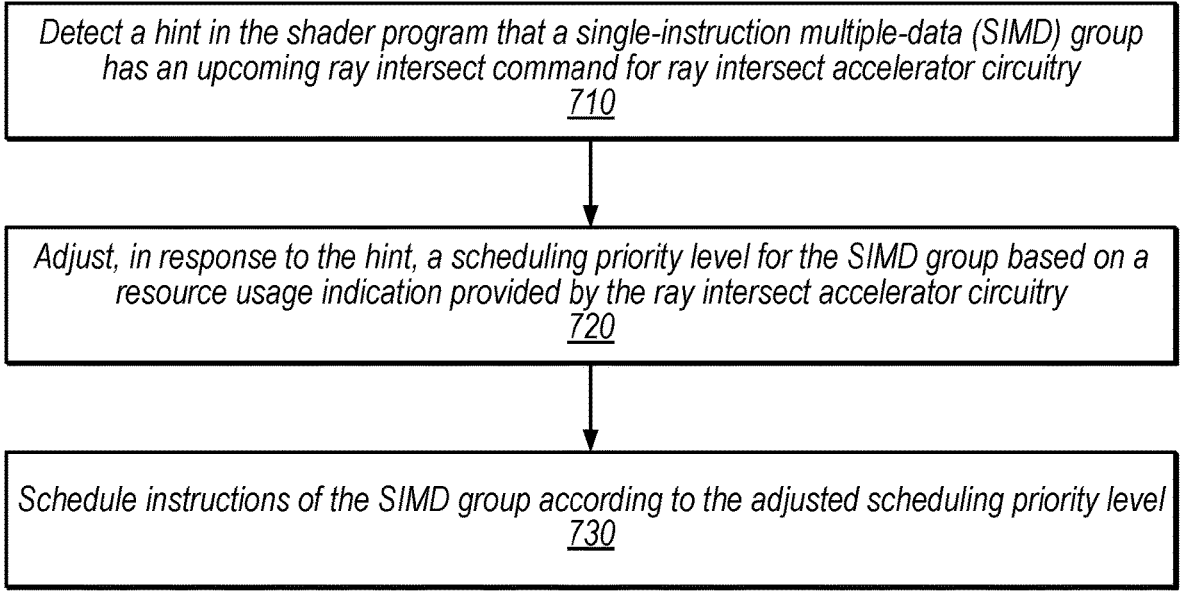
FIG. 7 is a flow diagram illustrating an example method, according to some embodiments.

FIG. 7 is a flow diagram illustrating an example method for scheduling graphics threads based on a ray tracing hint, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a processor detects a hint in the shader program that a single-instruction multiple-data (SIMD) group has an upcoming ray intersect command for ray intersect accelerator circuitry. The hint may be compiler-inserted.

At 720, in the illustrated embodiment, the processor adjusts, in response to the hint, a scheduling priority level for the SIMD group based on a resource usage indication provided by the ray intersect accelerator circuitry. Note that the adjustment may set a block indicator (e.g., a bit), change a numerical priority value, etc. wherein the adjusted scheduling priority level is a lower priority level than a prior scheduling priority level and the adjusting is based on the resource usage indication meeting a threshold usage level. Alternatively, the adjusted scheduling priority level may be a higher priority level than the first scheduling priority level and the adjustment may be based on the resource usage indication failing to meet a threshold usage level (e.g., when ray intersect accelerator 190 is not busy).

Note that the adjustment may block scheduling of the SIMD group based on the adjusted scheduling priority level and the resource usage indication meeting a threshold usage level but the processor may subsequently allow scheduling of the SIMD group in response to the resource usage indication failing to meet the threshold usage level.

In some embodiments, the processor deactivates the SIMD group from at least a portion of a processing pipeline to which it was scheduled prior to detection of the hint. The deactivation may be in response to execution of a yield instruction in software-assisted deactivation implementations.

The resource usage indication may indicate a number of available entries in a command buffer in the ray intersect accelerator circuitry. The processor may track resource usage of the ray intersect accelerator circuitry using credit control circuitry. The credit control circuitry may adjust a credit value in a first direction (e.g., decrement) in response to detecting a hint that the SIMD group will include one or more ray intersect commands and adjust the credit value in a second direction (e.g., increment) in response to a change in status of a ray intersection command in the ray intersect accelerator circuitry.

At 730, in the illustrated embodiment, the processor schedules instructions of the SIMD group according to the adjusted scheduling priority level.

The processor may include cache circuitry that stores data for a first memory space accessible to the ray intersect accelerator circuitry and the shader circuitry (e.g., shader core space) and one or more other memory spaces (e.g., thread private spaces, threadgroup spaces, etc.). The cache circuitry may evict data to a higher-level cache or memory according to an eviction policy. The hint may be included in the SIMD group prior to one or more instructions in the SIMD group that allocate space, in the first memory space, for ray data for the ray intersect command, which may advantageously allow scheduling circuitry to reduce cache thrashing.

Example Device

Figure 8:
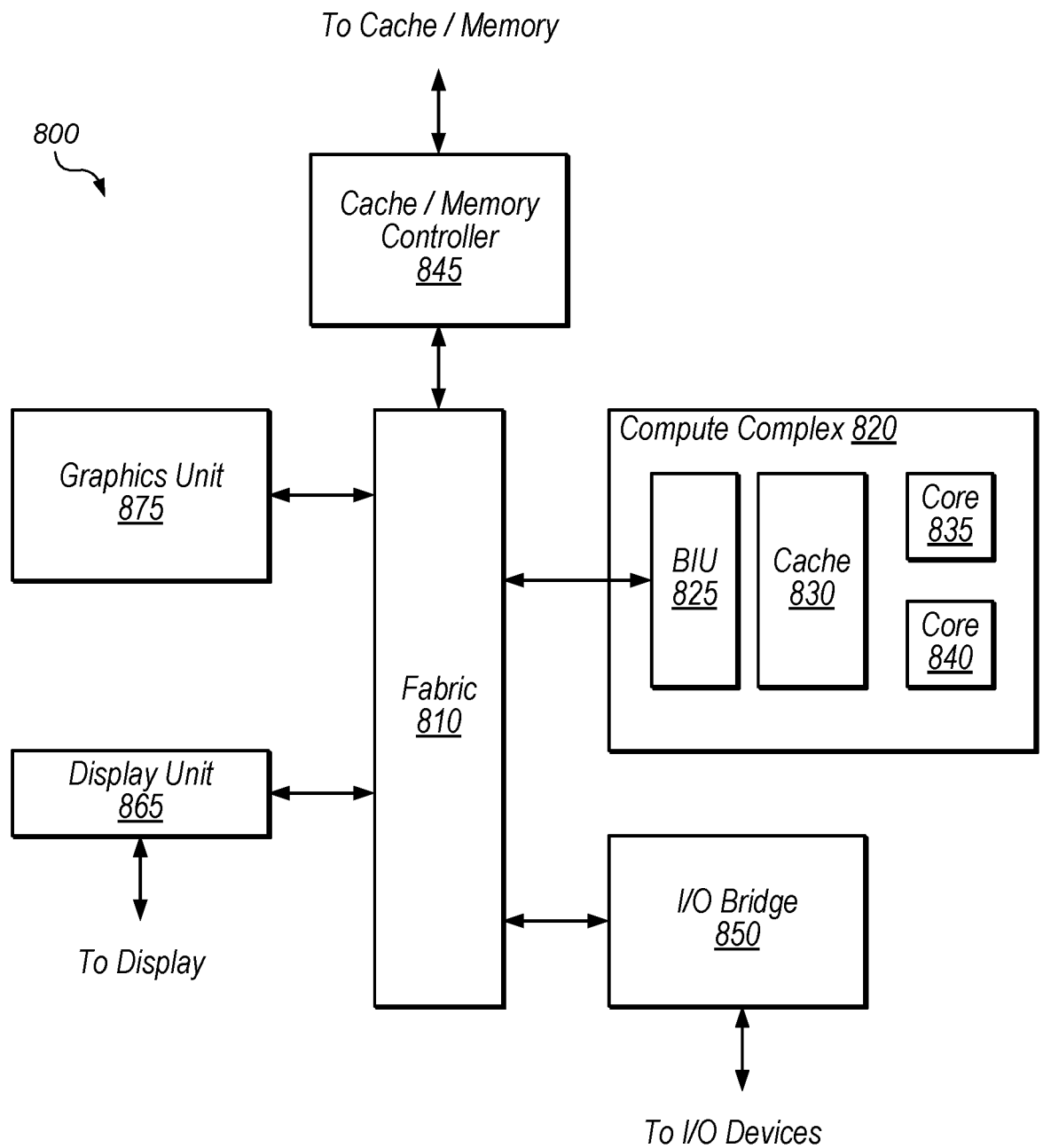
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions. These instructions may be stored in computer readable medium such as a memory coupled to memory controller 845 discussed below.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches. Memory coupled to controller 845 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 845 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 820 to cause the computing device to perform functionality described herein.

Graphics unit 875 may include one or more processors, e.g., one or more graphics processing units (GPUs). Graphics unit 875 may receive graphics-oriented instructions, such as OPENGL®, Metal®, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques may advantageously improve the performance of graphics unit 875 for ray tracing tasks, reduce its power consumption, avoid cache thrashing which may improve performance for other graphics tasks, or some combination thereof.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 800 with connectivity to various types of other devices and networks.

Example Applications

Figure 9:
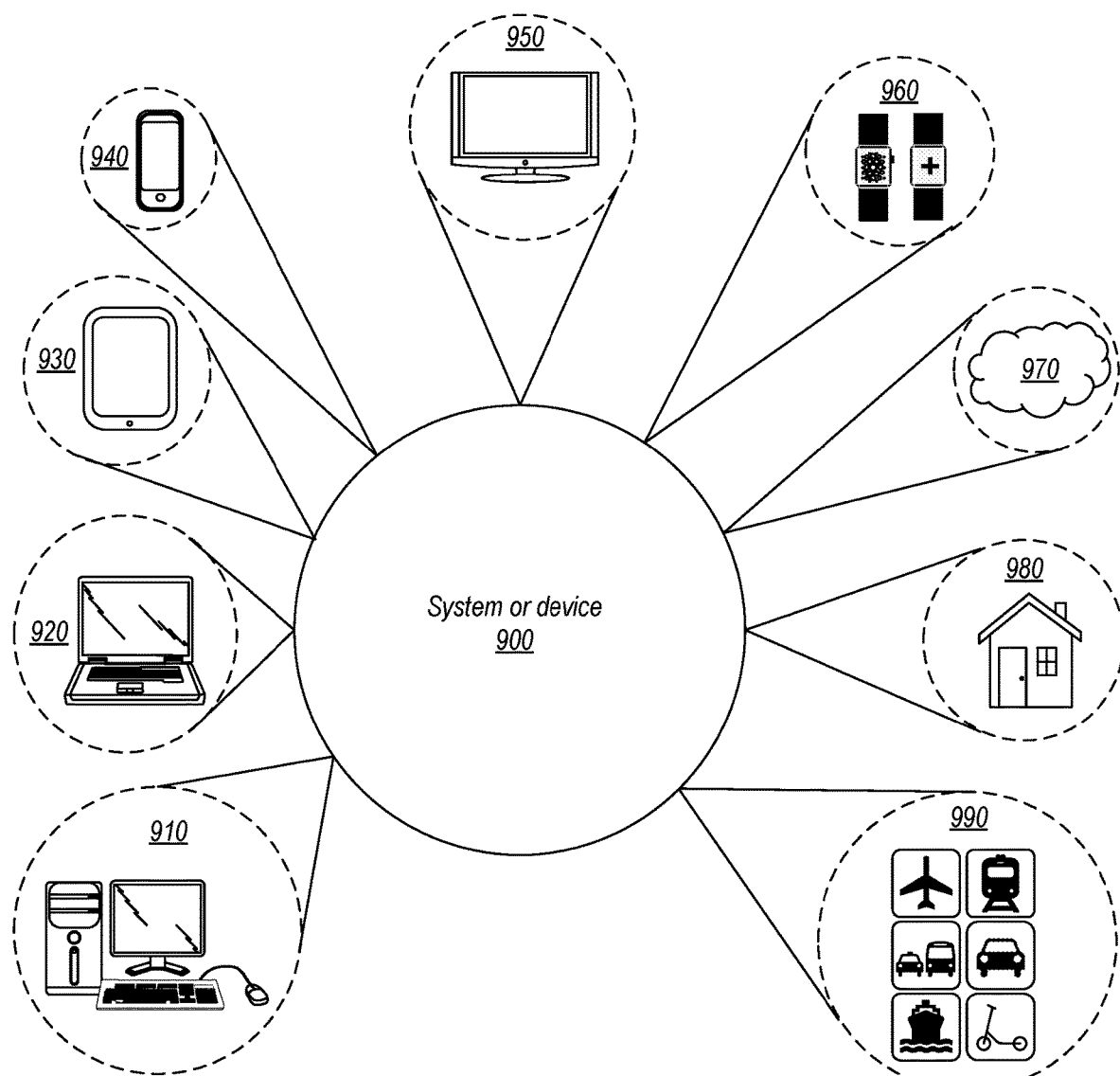
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 10:
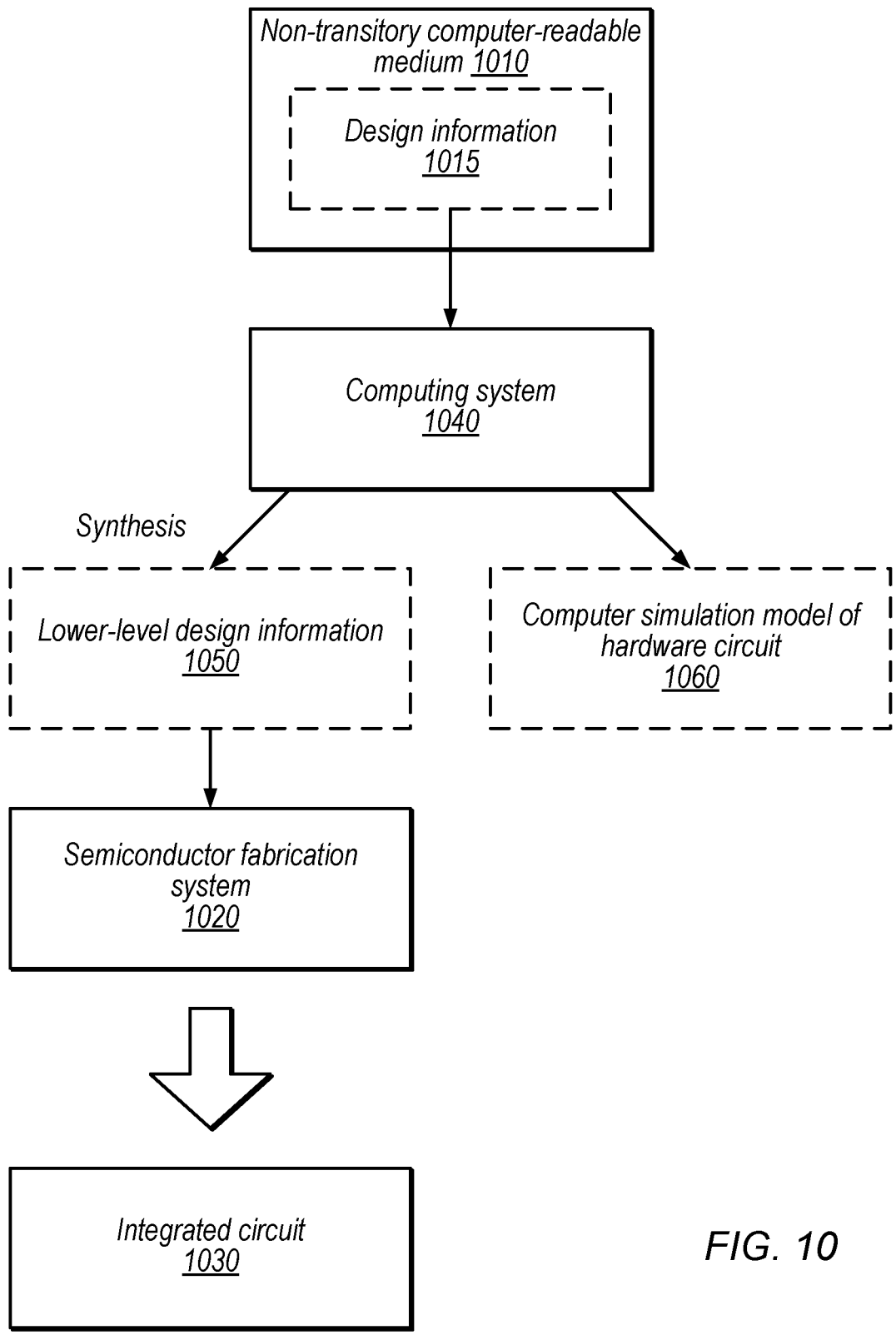
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment, computing system 1040 is configured to process the design information. This may include executing instructions included in the design information, interpreting instructions included in the design information, compiling, transforming, or otherwise updating the design information, etc. Therefore, the design information controls computing system 1040 (e.g., by programming computing system 1040) to perform various operations discussed below, in some embodiments.

In the illustrated example, computing system 1040 processes the design information to generate both a computer simulation model of a hardware circuit 1060 and lower-level design information 1050. In other embodiments, computing system 1040 may generate only one of these outputs, may generate other outputs based on the design information, or both. Regarding the computing simulation, computing system 1040 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1040 also processes the design information to generate lower-level design information 1050 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1050 (potentially among other inputs), semiconductor fabrication system 1020 is configured to fabricate an integrated circuit 1030 (which may correspond to functionality of the simulation model 1060). Note that computing system 1040 may generate different simulation models based on design information at various levels of description, including information 1050, 1015, and so on. The data representing design information 1050 and model 1060 may be stored on medium 1010 or on one or more other media.

In some embodiments, the lower-level design information 1050 controls (e.g., programs) the semiconductor fabrication system 1020 to fabricate the integrated circuit 1030. Thus, when processed by the fabrication system, the design information may program the fabrication system to fabricate a circuit that includes various circuitry disclosed herein.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Accordingly, non-transitory computer-readable storage medium 1010 may include two or more memory media; such media may reside in different locations—for example, in different computer systems that are connected over a network.

Design information 1015 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1040, semiconductor fabrication system 1020, or both. In some embodiments, design information may also include one or more cell libraries that specify the synthesis, layout, or both of integrated circuit 1030. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1030 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 and model 1060 are configured to operate according to a circuit design specified by design information 1015, which may include performing any of the functionality described herein. For example, integrated circuit 1030 may include any of various elements shown in FIGS. 1B, 2-3, 5, and 8. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1020 to fabricate integrated circuit 1030.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
ray intersect accelerator circuitry;
shader circuitry coupled to the ray intersect accelerator circuitry, the shader circuitry configured to:
assign a first scheduling priority level to a single-instruction multiple-data (SIMD) group that includes a set of multiple instructions;
detect a hint that the SIMD group has an upcoming ray intersect command for the ray intersect accelerator circuitry, prior to encountering the upcoming ray intersect command by the shader circuitry;
receive a resource usage indication from the ray intersect accelerator circuitry;
in response to the hint, adjust the scheduling priority level of the SIMD group to a second scheduling priority level, based on the resource usage indication, wherein the second scheduling priority level is a higher priority level than the first scheduling priority level and the adjustment is based on the resource usage indication failing to meet a threshold usage level; and
schedule instructions of the SIMD group for execution by the shader circuitry, according to the second scheduling priority level.

2. The apparatus of claim 1, wherein the shader circuitry is further configured to, in response to a second hint that a second SIMD group has an upcoming ray intersect command, adjust a scheduling priority of the second SIMD group from the second scheduling priority level to the first scheduling priority level based on a second resource usage indication meeting the threshold usage level.

3. The apparatus of claim 2, wherein the shader circuitry is further configured to:
block scheduling of the SIMD group based on the second scheduling priority level and the resource usage indication meeting the threshold usage level; and
allow scheduling of the SIMD group in response to the resource usage indication failing to meet the threshold usage level.

4. The apparatus of claim 1, wherein the shader circuitry is further configured to:
deactivate the SIMD group from at least a portion of a processing pipeline to which it was scheduled prior to detection of the hint.

5. The apparatus of claim 4, wherein the deactivation is in response to execution of a yield instruction.

6. The apparatus of claim 1, further comprising:
cache circuitry configured to:
store data for:
a first memory space accessible to the ray intersect accelerator circuitry and the shader circuitry; and
one or more other memory spaces; and
evict data to a higher-level cache or memory according to an eviction policy;
wherein the hint is included in the SIMD group prior to one or more instructions in the SIMD group that allocate space, in the first memory space, for ray data for the ray intersect command.

7. The apparatus of claim 1, wherein the resource usage indication indicates a number of available entries in a command buffer in the ray intersect accelerator circuitry.

8. The apparatus of claim 1, wherein the apparatus is configured to track resource usage of the ray intersect accelerator circuitry using credit control circuitry that is configured to:
adjust a credit value in a first direction in response to detecting a hint that the SIMD group will include one or more ray intersect commands; and
adjust the credit value in a second direction in response to a change in status of a ray intersection command in the ray intersect accelerator circuitry.

9. The apparatus of claim 1, wherein the hint is a compiler-inserted hint.

10. The apparatus of claim 1, wherein the apparatus is a computing device that further comprises:
a display;
a central processing unit; and
a network interface.

11. A non-transitory computer-readable medium having instructions of a shader program stored thereon that are executable by a computing device to perform operations comprising:
detecting a hint in the shader program that a single-instruction multiple-data (SIMD) group that includes a set of multiple instructions has an upcoming ray intersect command for ray intersect accelerator circuitry, wherein the detecting is performed prior to encountering the upcoming ray intersect command;
in response to the hint, adjusting a scheduling priority level for the SIMD group from a first priority level to a second priority level based on a resource usage indication provided by the ray intersect accelerator circuitry, wherein the second priority level is a higher priority level than the first priority level and the adjusting is based on the resource usage indication failing to meet a threshold usage level; and
scheduling instructions of the SIMD group according to the adjusted scheduling priority level.

12. The non-transitory computer-readable medium of claim 11, wherein the operations further comprise:
in response to a second hint that a second SIMD group has an upcoming ray intersect command, adjusting a scheduling priority of the second SIMD group from the second priority level to the first priority level based on a second resource usage indication meeting the threshold usage level.

13. The non-transitory computer-readable medium of claim 11, wherein the operations further comprise:
deactivating the SIMD group from at least a portion of a processing pipeline to which it was scheduled prior to detection of the hint.

14. The non-transitory computer-readable medium of claim 11, wherein the hint is included in the SIMD group prior to one or more instructions in the SIMD group that allocate space for ray data for the ray intersect command.

15. A method, comprising:
detecting, by a computing system, a hint in a shader program, wherein the hint indicates that a single-instruction multiple-data (SIMD) group that includes a set of multiple instructions has an upcoming ray intersect command for ray intersect accelerator circuitry, wherein the detecting is performed prior to encountering the upcoming ray intersect command;

in response to the hint, the computing system adjusting a scheduling priority level for the SIMD group from a first priority level to a second priority level based on a resource usage indication provided by the ray intersect accelerator circuitry, wherein the second priority level is a higher priority level than the first priority level and the adjusting is based on the resource usage indication failing to meet a threshold usage level; and scheduling, by the computing system, instructions of the SIMD group according to the adjusted scheduling priority level.

16. The method of claim 15, further comprising:

in response to a second hint that a second SIMD group has an upcoming ray intersect command, adjusting a scheduling priority of the second SIMD group from the second priority level to the first priority level based on a second resource usage indication meeting the threshold usage level.

17. The method of claim 16, further comprising:

blocking, by the computing system, scheduling of the SIMD group based on the second priority level and the resource usage indication meeting the threshold usage level; and allowing, by the computing system, scheduling of the SIMD group in response to the resource usage indication failing to meet the threshold usage level.

18. An apparatus, comprising:

ray intersect accelerator circuitry;

shader circuitry coupled to the ray intersect accelerator circuitry, the shader circuitry configured to:

assign a first scheduling priority level to a single-instruction multiple-data (SIMD) group that includes a set of multiple instructions;

detect a hint that the SIMD group has an upcoming ray intersect command for the ray intersect accelerator circuitry, prior to encountering the upcoming ray intersect command by the shader circuitry;

receive a resource usage indication from the ray intersect accelerator circuitry;

in response to the hint, adjust the scheduling priority level of the SIMD group to a second scheduling priority level, based on the resource usage indication, wherein the second scheduling priority level is a lower priority level than the first scheduling priority level and the assignment is based on the resource usage indication meeting a threshold usage level; and schedule instructions of the SIMD group for execution by the shader circuitry, according to the second scheduling priority level.

19. The apparatus of claim 18, wherein the shader circuitry is further configured to:

block scheduling of the SIMD group based on the second scheduling priority level and the resource usage indication meeting the threshold usage level.

20. The apparatus of claim 18, wherein the shader circuitry is further configured to:

deactivate the SIMD group from at least a portion of a processing pipeline to which it was scheduled prior to detection of the hint.

21. The apparatus of claim 18, wherein the apparatus is configured to track resource usage of the ray intersect accelerator circuitry using credit control circuitry that is configured to:

adjust a credit value in a first direction in response to detecting a hint that the SIMD group will include one or more ray intersect commands; and adjust the credit value in a second direction in response to a change in status of a ray intersection command in the ray intersect accelerator circuitry.

* * * * *